United States Patent [19]

Meining, deceased et al.

[11] Patent Number: 5,096,310

[45] Date of Patent: Mar. 17, 1992

[54] ROLLING BEARING WITH SEPARATED BEARING RING

[75] Inventors: Hans Meining, deceased, late of Dittelbrunn, by Gertrud I. Meining, Jurgen G. Meining, Bingen; Wolfgang W. Meining, Andre E. Meining, Alexander R. Meining, Heirs; all of Dittelbrunn; Alfred Weidinger, Oberwerrn; Theo Schmitt, Erlabrunn; Manfred Schlegelmilch, Massbach, all of Fed. Rep. of Germany

[73] Assignee: SKF GmbH, Schweinfurt, Fed. Rep. of Germany

[21] Appl. No.: 923,405

[22] Filed: Oct. 27, 1986

[30] Foreign Application Priority Data

Oct. 25, 1985 [DE] Fed. Rep. of Germany ....... 3537985

[51] Int. Cl.$^5$ ............................................. F16C 33/38
[52] U.S. Cl. .................................... 384/539; 38/506; 38/560
[58] Field of Search ................ 384/539, 560, 506, 585, 384/903

[56] References Cited

U.S. PATENT DOCUMENTS

| 4,463,994 | 8/1984 | Eliason et al. | 384/506 |
| 4,602,876 | 7/1986 | Miki et al. | 384/585 |
| 4,647,230 | 3/1987 | Friedrich et al. | 384/539 |
| 4,647,231 | 3/1987 | Harsdorff | 384/560 |

FOREIGN PATENT DOCUMENTS 8125875 9/1981 Fed. Rep. of Germany .

Primary Examiner—Lenard A. Footland
Attorney, Agent, or Firm—Rosen, Dainow & Jacobs

[57] ABSTRACT

A rolling bearing having separated bearing ring halves held together by a dimensionally stable holding ring tightly fit over the ends of the ring halves. The axial holding of the ring halves is effected by a row of snap elements distributed about the circumference of the holding ring, the snap elements extending into annular grooves adjacent the ends of the ring halves. The snap elements are joined to the surface of the holding ring to enable bending at the joints thereof.

7 Claims, 1 Drawing Sheet

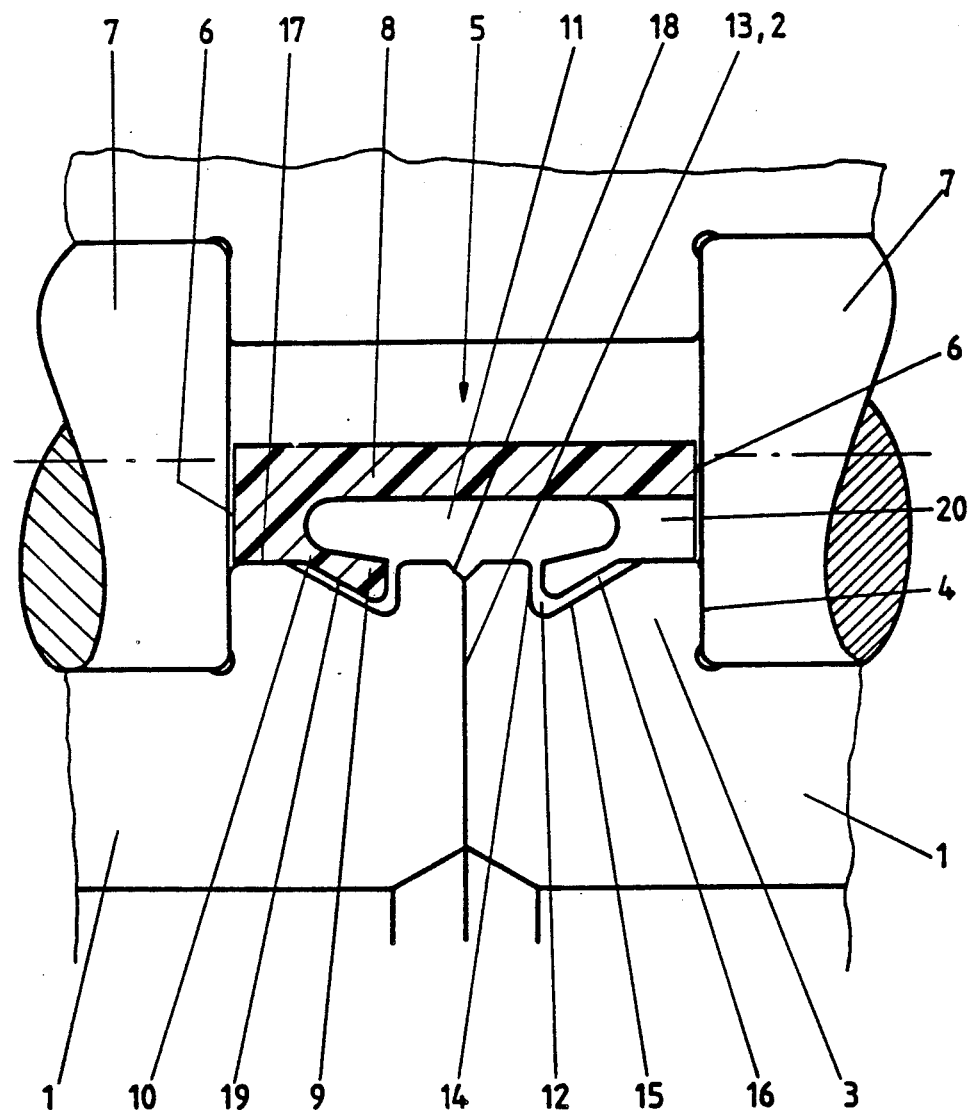

ROLLING BEARING WITH SEPARATED BEARING RING

This invention relates to rolling bearings, and more particularly to rolling bearings having outer and inner bearing rings, with at least one of the rings being axially separated into two adjacent ring halves, and including a holding ring for holding the ring halves together.

DE-GM 81 25 975 discloses a rolling bearing with a divided inner ring, whose ring halves are provided with a holding ring. The rolling bearing described therein has two rows of tapered rollers in a O arrangement. In the assembly of this bearing it is necessary to guide the two inner rings positively from both sides. In order to prevent the assembly from falling apart during transporting or to simplify the assembly of the rolling bearing the two inner rings are held together by a holding ring during the assembly. This holding ring is of elastic material, such as a plastic material, and has a U-shaped profile. The two side arms of the profile form annular closed projections on both sides thereof, each of which engages a groove adjacent the separation position of the ring halves. The sleeve shaped section engages the outer surface of the ring halves to thereby provide a form fit connection of the ring halves. In order to render assembly possible, the outer surfaces of the ring havles in a beginning region of each side surface are initially conically inclined, to produce a run up ramp for the sleeve shaped section. Upon pushing together the ring halves the projections of the holding ring slide on the run up ramp. As a result expansion of the entire holding ring is necessary, which, inclusive of the ring shaped projections, must be enlarged at least in the radial dimension. This necessity places extreme demands on the elasticity of the material. In particular the reverse holding of the known holding ring is very unsatisfactory due to the inadequate dimensions of the projections for the production of the necessary projections. Thus elastic material must be used to a greater extent, or the holding ring must be thinner or be provided with thinner walls, so that a very unstable connection is achieved.

In the state of the art, holding rings are used not only for two row roller bearings, but also for two row inclined ball bearings or in single row three and four point bearings. Depending upon the arrangement, the rolling bodies can also run on the holding ring, whereby elastic arrangements of the known, above discussed holding rings produce fundamentally poor operating conditions, since* the contact surface gives way, and is exposed to wear, or has too small a surface.

It is the object of this invention to provide a rolling bearing of the above described type whose ring halves necessitate the exertion of minimum effort during asse*mbly while providing a dependable and stable form fit in the axial and radial directions.

Briefly stated, in accordance with the invention, this object is solved by the provision of an arrangement wherein the holding ring has an inherently rigid stable sleeve shaped section and the projections are inclined with respect to the radial plane of the bearing and to one another and are elastically bendable at their junctions with the sleeve shaped section.

The projections are formed on the sleeve shaped section for example by way of a film joint, i.e. they are joined to the sleeve shaped section by a thin section of plastic material defining a preferred bending position. This feature enables the simple assembly of the bearing since the flexibility of movement of the projections is adequately insured. The sleeve shaped section is unitary with these projections and can thereby have a sufficiently large wall thickness to be dimensionally stable, since in accordance with the invention the sleeve shaped section does not have to be expanded during assembly. For this reason a substantially firm or rigid material having load bearing capabilities can be used that gives the entire holding ring the desired dimensional stability to provide a reliable form fit on the bearing ring in the radial direction. Furthermore sufficiently large and abrasion proof running surfaces on the holding ring for the rolling bodies are also produced. The circumferential surfaces of the holding ring in accordance with the invention fully engage the corresponding shoulder surface of the ring halves.

A conical run up ramp on the ring halves for the assembly is also not necessary in the bearing of the invention, since the inclined running projections themselves have such a form and yield when the ring half is pushed thereon by way of the customary small fastening rims of the ring halves. The projections, which are inclined to one another in accordance with the invention, are not required to bend upon movement of the ring halves from one another, but on the contrary preferably bend in response to pressure in the direction of their inclined surfaces linearly to the sides of the sleeeve shaped sections, so that therefore a more ideal, yet powerful more easily releasable axial form fit is produced. It is self evident that release of this form fit with suitable means as needed without damage to the bearing is possible. The holding ring in accordance with the invention can be used in all bearings requiring such a connection and is useful either for inner bearing rings or outer bearing rings, if a corresponding annular groove is provided on their outer surfaces or in their bore surfaces, respectively.

In accordance with a further feature of the invention the projections are circumferentially distributed snap elements that are movable independently of one another. The snap elements are preferrably stressed in bending, and major material stretching during assemble is minimized. Furthermore the force necessary for the bending deformation during assembly is considerably reduced.

In an advantageous feature of the invention an intermediate space is provided in the form of a recess extending in the circumferential direction between the snap elements, and the snap elements on each axial end of the holding ring are circumferentially displaced from the snap elements on the other axial end thereof about one division step in the circumferential direction. These circumferentially displaced snap elements are aligned with the intermediate spaces between the snap elements on the opposite end of the holding ring, to provide a special advantage in the production of the holding ring by injection molding techniques, for example of plastic material. The tool for the formation of the ring holder has finger like projections extending axially through the intermediate spaces between the snap elements, and is introduced axially from both sides of the holding ring to enable the formation in a simple manner of an uninterrupted ring section in the axially central regions between the snap elements. This technique enables the axial formation of the holding ring. The work tools can therefore be produced with minimum expense and are adapted to be usable in a simple and economical molding machine.

In accordance with a still further feature of the invention the annular grooves are V-shaped with the side thereof adjacent the separation line of the bearing ring halves extending in a radial plane, the other sides of the grooves having conically inclined annular surfaces, whereby the profile of the snap elements is adapted to the shape of the annular grooves. In the sprung out condition of the snap elements a small gap can be provided between the opposite surfaces of the annular groove and the snap elements. As a result of the matching shapes of the annular groove an especially stable axial form fit is provided, even during movement of the ring halves which can arise due to unexpected high forces such as in the disassembly of the rolling bearing. Furthermore the annular gap provided contributes to the end, not to avoiding manufacturing tolerances to equalize respectively the springing in of the snap elements during assembly to ease. It is especially advantageous to provide a large number of circumferentially distributed snap elements, e.g. twelve, since thereby the width of the snap elements in the circumferential direction of the holding rings is relatively small and the necessary circumferential curvature causes no substantial limitation on the bendability of the elements.

In order that the invention may be clearly understood, it will now be disclosed in greater detail with reference to the accompanying drawing, wherein:

The single FIGURE of the drawing is a partially longitudinal cross-sectional view of a rolling bearing in accordance with the invention.

Referring now to the drawing, a rolling bearing is illustrated therein having an inner and an outer ring between which rollers 7 roll. One of the bearing rings is separated into two ring halves 1. The two ring halves 1 have axial end faces 2 directed toward one another, these end faces 2 abutting one another. The rings 1 have restraining flanges 3 spaced from the ends faces 2, on one radial side thereof, the axial end surfaces 4 of the rollers 2 running on the flanges 3. The ring halves are form fit to a holding ring 5, the ring 5 having an axial width equal to the sum of the lengths of the restraining flanges 3 of the two ring halves 1. The ends 6 of the holding ring 5 extend to the ends of the rollers 7. The holding ring 5 is comprised of a substantially sleeve shaped section 8 with greater wall thickness. Snap elements 9 are formed on both ends of the holding ring 5, the snap elements being inclined with respect to the radial plane of the bearing and having free ends directed toward one another and toward the abutting ends of the rings halves 1. A plurality of such snap elements are distributed about the circumference of the holding ring at each end thereof. These elements define a bending position at the transition region 10 of the sleeve shaped section 8 which permits the bending of each individual snap element 9 into straight axial alignment. The sleeve shaped section 8 has an annular recess 11 which provides an adequately large space for receiving the snap elements 9. In the assembled condition the snap elements 9 are sprung out and each of them extends into a V-shaped annular groove 12 formed in the flanges 3 of the two ring halves 1. The groove surface 14 adjacent the separation plane of the ring halves extends in a radial plane, while the opposite sides of the annular groove 12 are inclined with respect to the roller 7. The grooves 12 are formed with the shape of the snap elements 9, whereby a gap 16 may exist in the form of an intermediate space. The sleeve shaped section 8 sits, on the contrary, without play on the outer surface 17 of the flange 3. The individual steps in the assembly of the bearing are not herein illustrated, but they are simple and easily realizable. The small contacting edge 18 of one of the ring halves 1 is positioned against the radial inner back surface 19 of the snap elements 9, which serve the function of ramps. The respective snap elements 9 are thereby forced into the annular recess 11 upon bending at the respective transition regions 10. Upon further movement the snap elements 9 reach the region of the groove 12 and automatically spring outwardly into the groove 12. The same procedure is effected at the other side of the holding ring 5 by the guiding of the other ring half 1, the respective other end of the holding ring 5 being now supported by its facing surface 6 on the roller 7.

In a simplified method of fabricating the holding ring by injection molding techniques, one of the rows of snap elements is displaced with respect to the other row about one division step in the circumferential direction, so that snap elements 9 of one of the rows are axially aligned with equally wide intermediate spaces 20 of the other row.

While the invention has been disclosed and described with reference to a single embodiment thereof, it will be apparent that many variations and modifications may be made therein, and it is therefore intended in the following claims to cover each such variation and modification as falls within the true spirit and scope of the invention.

What is claimed is:

1. In a rolling bearing having inner and outer radially separated races, one of said races comprising first and second axially adjacent ring halves, said ring halves having annular grooves in their circumferential surfaces adjacent the separation point of the ring halves, and a holding ring having projections extending from both sides thereof into said annular grooves, the holding ring closely fitting the ring halves; the improvement wherein the holding ring has a dimensionally stable sleeve shaped section and the projections are formed to be elastically bending at the sleeve shaped section and are inclined with respect to the radial plane of the bearing and to one another.

2. The rolling bearing of claim 1 wherein the projections are circumferentially distributed snap elements that are movable independently of one another.

3. The rolling bearing of claim 2 wherein and intermediate space is provided between the snap elements comprised of a recess extending in the circumferential direction and the snap elements on one end of the holding ring are displaced in the circumferential direction with respect to the snap elements on the other end of the holding ring about one separation step.

4. The rolling bearing of claim 2 wherein the profile of the snap elements is adapted to that of the annular groove and a small gap is provided between the opposed outer surfaces of the groove and the snap elements, in the sprung out condition of the snap elements.

5. The rolling bearing of claim 2 wherein at least twelve of said snap elements are provided distributed about the circumference of said holding ring.

6. The rolling bearing of claim 1, wherein the annular grooves are V-shaped with the sides thereof adjacent the separation region between the ring halves extending in radial planes and the other ends of the grooves being conical inclined annular surfaces.

* * * * *

UNITED STATES PATENT AND TRADEMARK OFFICE
CERTIFICATE OF CORRECTION

PATENT NO. : 5,096,310
DATED : March 17, 1992
INVENTOR(S) : Meining, deceased et al.

It is certified that error appears in the above-indentified patent and that said Letters Patent is hereby corrected as shown below:

Column 4, line 32, replace claim 1 with the following:

-- 1. In a rolling bearing having inner and outer radially separated races, one of said races comprising first and second axially adjacent ring halves, said ring halves having annular grooves in their circumferential surfaces adjacent the separation point of the ring halves, and a holding ring having projections extending from both sides thereof into said annular grooves, the holding ring closely fitting the ring halves axially and, radially, over the bore surface; the improvement wherein the holding ring has a dimensionally stable sleeve shaped section lying in contact with the peripheral surface of the ring halves without any clearance and the projections are formed to be elastically bending at the sleeve shaped section and are inclined with respect to the radial plane of the bearing and to one another and deformable radially with flexural elasticity into said annular grooves and formed to match said annular grooves to a level which is flush with the peripheral surface of the ring halves. --.

UNITED STATES PATENT AND TRADEMARK OFFICE
CERTIFICATE OF CORRECTION

PATENT NO. : 5,096,310
DATED : March 17, 1992
INVENTOR(S) : Meining, deceased et al.

It is certified that error appears in the above-indentified patent and that said Letters Patent is hereby corrected as shown below:

Column 4, line 68, insert claim 7 as follows:

-- 7. The rolling bearing of claim 1 wherein said holding ring extends only between the inner ends of the rollers. --.

Signed and Sealed this

Fifteenth Day of August, 1995

Attest:

BRUCE LEHMAN

*Attesting Officer*  *Commissioner of Patents and Trademarks*